(12) United States Patent
Griffin et al.

(10) Patent No.: US 11,233,833 B2
(45) Date of Patent: *Jan. 25, 2022

(54) INITIATING A CONFERENCING MEETING USING A CONFERENCE ROOM DEVICE

(71) Applicant: Cisco Technology, Inc., San Jose, CA (US)

(72) Inventors: Keith Griffin, Oranmore (IE); Otto N. Williams, Berkeley, CA (US); Wayne Moorefield, Jr., Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/725,899

(22) Filed: Dec. 23, 2019

(65) Prior Publication Data

US 2020/0137130 A1 Apr. 30, 2020

Related U.S. Application Data

(63) Continuation of application No. 15/435,892, filed on Feb. 17, 2017, now Pat. No. 10,516,707.

(Continued)

(51) Int. Cl.
*H04L 12/18* (2006.01)
*H04L 29/06* (2006.01)
(Continued)

(52) U.S. Cl.
CPC ............ *H04L 65/403* (2013.01); *G06F 3/167* (2013.01); *G06Q 10/06311* (2013.01);
(Continued)

(58) Field of Classification Search
CPC .............. H04L 63/105; H04L 12/1822; H04L 12/1818; H04L 12/18; H04L 51/043;
(Continued)

(56) References Cited

U.S. PATENT DOCUMENTS

| 4,460,807 | A | 7/1984 | Kerr et al. |
| 4,890,257 | A | 12/1989 | Anthias et al. |

(Continued)

FOREIGN PATENT DOCUMENTS

| CN | 101055561 | 10/2007 |
| CN | 101076060 | 11/2007 |

(Continued)

OTHER PUBLICATIONS

Author Unknown, "A Primer on the H.323 Series Standard," Version 2.0, available at http://www.packetizer.com/voip/h323/papers/primer/, retrieved on Dec. 20, 2006, 17 pages.

(Continued)

*Primary Examiner* — Jungwon Chang
(74) *Attorney, Agent, or Firm* — Polsinelli PC

(57) ABSTRACT

The disclosed technology addresses the need in the art for a conference room device configured to aid the initiation, organization, and management of a conference meeting. A conference room device is configured to determine that a user is within a threshold distance of a conference room device and that the user is associated with a conference meeting at a current time. The conference room device is further configured to prompt the user to start the conference meeting, receive a confirmation from the user; and start the conference meeting.

20 Claims, 6 Drawing Sheets

Related U.S. Application Data

(60) Provisional application No. 62/434,805, filed on Dec. 15, 2016.

(51) Int. Cl.
  *G06Q 10/06* (2012.01)
  *G06F 3/16* (2006.01)
  *H04L 29/08* (2006.01)
  *H04L 12/58* (2006.01)

(52) U.S. Cl.
  CPC ... *G06Q 10/06314* (2013.01); *H04L 12/1818* (2013.01); *H04L 65/1069* (2013.01); *H04L 67/18* (2013.01); H04L 51/20 (2013.01); H04L 67/24 (2013.01); H04L 67/325 (2013.01)

(58) Field of Classification Search
  CPC ... H04L 65/403; H04L 65/1069; H04L 67/18; H04L 67/24; H04L 67/325; H04L 51/20; H04W 4/023; H04W 4/80; H04W 4/02; H04M 3/56; G06Q 10/06314; G06Q 10/06311; G06F 3/167
  See application file for complete search history.

(56) References Cited

U.S. PATENT DOCUMENTS

| | | |
|---|---|---|
| 4,977,605 A | 12/1990 | Fardeau et al. |
| 5,293,430 A | 3/1994 | Shiau et al. |
| 5,694,563 A | 12/1997 | Belfiore et al. |
| 5,699,082 A | 12/1997 | Marks et al. |
| 5,745,711 A | 4/1998 | Kitahara et al. |
| 5,767,897 A | 6/1998 | Howell |
| 5,825,858 A | 10/1998 | Shaffer et al. |
| 5,874,962 A | 2/1999 | de Judicibus et al. |
| 5,889,671 A | 3/1999 | Autermann et al. |
| 5,917,537 A | 6/1999 | Lightfoot et al. |
| 5,995,096 A | 11/1999 | Kitahara et al. |
| 6,023,606 A | 2/2000 | Monte et al. |
| 6,040,817 A | 3/2000 | Sumikawa |
| 6,075,531 A | 6/2000 | DeStefano |
| 6,085,166 A | 7/2000 | Beckhardt et al. |
| 6,191,807 B1 | 2/2001 | Hamada et al. |
| 6,300,951 B1 | 10/2001 | Filetto et al. |
| 6,392,674 B1 | 5/2002 | Hiraki et al. |
| 6,424,370 B1 | 7/2002 | Courtney |
| 6,463,473 B1 | 10/2002 | Gubbi |
| 6,553,363 B1 | 4/2003 | Hoffman |
| 6,554,433 B1 | 4/2003 | Holler |
| 6,573,913 B1 | 6/2003 | Butler et al. |
| 6,646,997 B1 | 11/2003 | Baxley et al. |
| 6,665,396 B1 | 12/2003 | Khouri et al. |
| 6,700,979 B1 | 3/2004 | Washiya |
| 6,711,419 B1 | 3/2004 | Mori |
| 6,754,321 B1 | 6/2004 | Innes et al. |
| 6,754,335 B1 | 6/2004 | Shaffer et al. |
| RE38,609 E | 10/2004 | Chen et al. |
| 6,816,464 B1 | 11/2004 | Scott et al. |
| 6,865,264 B2 | 3/2005 | Berstis |
| 6,938,208 B2 | 8/2005 | Reichardt |
| 6,978,499 B2 | 12/2005 | Gallant et al. |
| 7,046,134 B2 | 5/2006 | Hansen |
| 7,046,794 B2 | 5/2006 | Piket et al. |
| 7,058,164 B1 | 6/2006 | Chan et al. |
| 7,058,710 B2 | 6/2006 | McCall et al. |
| 7,062,532 B1 | 6/2006 | Sweat et al. |
| 7,085,367 B1 | 8/2006 | Lang |
| 7,124,164 B1 | 10/2006 | Chemtob |
| 7,149,499 B1 | 12/2006 | Oran et al. |
| 7,180,993 B2 | 2/2007 | Hamilton |
| 7,209,475 B1 | 4/2007 | Shaffer et al. |
| 7,340,151 B2 | 3/2008 | Taylor et al. |
| 7,366,310 B2 | 4/2008 | Stinson et al. |
| 7,418,664 B2 | 8/2008 | Ben-Shachar et al. |
| 7,441,198 B2 | 10/2008 | Dempski et al. |
| 7,478,339 B2 | 1/2009 | Pettiross et al. |
| 7,500,200 B2 | 3/2009 | Kelso et al. |
| 7,530,022 B2 | 5/2009 | Ben-Shachar et al. |
| 7,552,177 B2 | 6/2009 | Kessen et al. |
| 7,577,711 B2 | 8/2009 | McArdle |
| 7,584,258 B2 | 9/2009 | Maresh |
| 7,587,028 B1 | 9/2009 | Broerman et al. |
| 7,606,714 B2 | 10/2009 | Williams et al. |
| 7,606,862 B2 | 10/2009 | Swearingen et al. |
| 7,620,902 B2 | 11/2009 | Manion et al. |
| 7,634,533 B2 | 12/2009 | Rudolph et al. |
| 7,774,407 B2 | 8/2010 | Daly et al. |
| 7,792,277 B2 | 9/2010 | Shaffer et al. |
| 7,830,814 B1 | 11/2010 | Allen et al. |
| 7,840,013 B2 | 11/2010 | Dedieu et al. |
| 7,840,980 B2 | 11/2010 | Gutta |
| 7,881,450 B1 | 2/2011 | Gentle et al. |
| 7,920,160 B2 | 4/2011 | Tamaru et al. |
| 7,956,869 B1 | 6/2011 | Gilra |
| 7,986,372 B2 | 7/2011 | Ma et al. |
| 7,995,464 B1 | 8/2011 | Croak et al. |
| 8,059,557 B1 | 11/2011 | Sigg et al. |
| 8,081,205 B2 | 12/2011 | Baird et al. |
| 8,140,973 B2 | 3/2012 | Sandquist et al. |
| 8,169,463 B2 | 5/2012 | Enstad et al. |
| 8,219,624 B2 | 7/2012 | Haynes et al. |
| 8,274,893 B2 | 9/2012 | Bansal et al. |
| 8,290,998 B2 | 10/2012 | Stienhans et al. |
| 8,301,883 B2 | 10/2012 | Sundaram et al. |
| 8,340,268 B2 | 12/2012 | Knaz |
| 8,358,327 B2 | 1/2013 | Duddy |
| 8,423,615 B1 | 4/2013 | Hayes |
| 8,428,234 B2 | 4/2013 | Knaz |
| 8,433,061 B2 | 4/2013 | Cutler |
| 8,434,019 B2 | 4/2013 | Nelson |
| 8,456,507 B1 | 6/2013 | Mallappa et al. |
| 8,462,103 B1 | 6/2013 | Moscovitch et al. |
| 8,478,848 B2 | 7/2013 | Minert |
| 8,520,370 B2 | 8/2013 | Waitzman, III et al. |
| 8,625,749 B2 | 1/2014 | Jain et al. |
| 8,630,208 B1 | 1/2014 | Kjeldaas |
| 8,638,354 B2 | 1/2014 | Leow et al. |
| 8,645,464 B2 | 2/2014 | Zimmet et al. |
| 8,675,847 B2 | 3/2014 | Shaffer et al. |
| 8,694,587 B2 | 4/2014 | Chaturvedi et al. |
| 8,694,593 B1 | 4/2014 | Wren et al. |
| 8,706,539 B1 | 4/2014 | Mohler |
| 8,732,149 B2 | 5/2014 | Lida et al. |
| 8,738,080 B2 | 5/2014 | Nhiayi et al. |
| 8,751,572 B1 | 6/2014 | Behforooz et al. |
| 8,831,505 B1 | 9/2014 | Seshadri |
| 8,850,203 B2 | 9/2014 | Sundaram et al. |
| 8,860,774 B1 | 10/2014 | Sheeley et al. |
| 8,874,644 B2 | 10/2014 | Allen et al. |
| 8,890,924 B2 | 11/2014 | Wu |
| 8,892,646 B2 | 11/2014 | Chaturvedi et al. |
| 8,914,444 B2 | 12/2014 | Hladik, Jr. |
| 8,914,472 B1 | 12/2014 | Lee et al. |
| 8,924,862 B1 | 12/2014 | Luo |
| 8,930,840 B1 | 1/2015 | Riskó et al. |
| 8,947,493 B2 | 2/2015 | Lian et al. |
| 8,972,494 B2 | 3/2015 | Chen et al. |
| 9,003,445 B1 | 4/2015 | Rowe |
| 9,031,839 B2 | 5/2015 | Thorsen et al. |
| 9,032,028 B2 | 5/2015 | Davidson et al. |
| 9,075,572 B2 | 7/2015 | Ayoub et al. |
| 9,118,612 B2 | 8/2015 | Fish et al. |
| 9,131,017 B2 | 9/2015 | Kurupacheril et al. |
| 9,137,376 B1 | 9/2015 | Basart et al. |
| 9,143,729 B2 | 9/2015 | Anand et al. |
| 9,165,281 B2 | 10/2015 | Orsolini et al. |
| 9,197,701 B1 | 11/2015 | Petrov et al. |
| 9,197,848 B2 | 11/2015 | Felkai et al. |
| 9,201,527 B2 | 12/2015 | Kripalani et al. |
| 9,203,875 B2 | 12/2015 | Huang et al. |
| 9,204,099 B2 | 12/2015 | Brown |
| 9,219,735 B2 | 12/2015 | Hoard et al. |
| 9,246,855 B2 | 1/2016 | Maehiro |
| 9,258,033 B2 | 2/2016 | Showering |

(56) References Cited

U.S. PATENT DOCUMENTS

| | | |
|---|---|---|
| 9,268,398 B2 | 2/2016 | Tipirneni |
| 9,298,342 B2 | 3/2016 | Zhang et al. |
| 9,323,417 B2 | 4/2016 | Sun et al. |
| 9,335,892 B2 | 5/2016 | Ubillos |
| 9,349,119 B2 | 5/2016 | Desai et al. |
| 9,367,224 B2 | 6/2016 | Ananthakrishnan et al. |
| 9,369,673 B2 | 6/2016 | Ma et al. |
| 9,407,621 B2 | 8/2016 | Vakil et al. |
| 9,432,512 B2 | 8/2016 | You |
| 9,449,303 B2 | 9/2016 | Underhill et al. |
| 9,495,664 B2 | 11/2016 | Cole et al. |
| 9,513,861 B2 | 12/2016 | Lin et al. |
| 9,516,022 B2 | 12/2016 | Borzycki et al. |
| 9,525,711 B2 | 12/2016 | Ackerman et al. |
| 9,553,799 B2 | 1/2017 | Tarricone et al. |
| 9,563,480 B2 | 2/2017 | Messerli et al. |
| 9,609,030 B2 | 3/2017 | Sun et al. |
| 9,609,514 B2 | 3/2017 | Mistry et al. |
| 9,614,756 B2 | 4/2017 | Joshi |
| 9,640,194 B1 | 5/2017 | Nemala et al. |
| 9,667,799 B2 | 5/2017 | Olivier et al. |
| 9,674,625 B2 | 6/2017 | Armstrong-Mutner |
| 9,762,709 B1 | 9/2017 | Snyder et al. |
| 10,516,707 B2* | 12/2019 | Griffin ............. G06Q 10/06314 |
| 2001/0030661 A1 | 10/2001 | Reichardt |
| 2002/0018051 A1 | 2/2002 | Singh |
| 2002/0076003 A1 | 6/2002 | Zellner et al. |
| 2002/0078153 A1 | 6/2002 | Chung et al. |
| 2002/0140736 A1 | 10/2002 | Chen |
| 2002/0188522 A1 | 12/2002 | McCall et al. |
| 2003/0028647 A1 | 2/2003 | Grosu |
| 2003/0046421 A1 | 3/2003 | Horvitz et al. |
| 2003/0068087 A1 | 4/2003 | Wu et al. |
| 2003/0154250 A1 | 8/2003 | Miyashita |
| 2003/0174826 A1 | 9/2003 | Hesse |
| 2003/0187800 A1 | 10/2003 | Moore et al. |
| 2003/0197739 A1 | 10/2003 | Bauer |
| 2003/0227423 A1 | 12/2003 | Arai et al. |
| 2004/0039909 A1 | 2/2004 | Cheng |
| 2004/0054885 A1 | 3/2004 | Bartram et al. |
| 2004/0098456 A1 | 5/2004 | Krzyzanowski et al. |
| 2004/0210637 A1 | 10/2004 | Loveland |
| 2004/0253991 A1 | 12/2004 | Azuma |
| 2004/0267938 A1 | 12/2004 | Shoroff et al. |
| 2005/0014490 A1 | 1/2005 | Desai et al. |
| 2005/0031136 A1 | 2/2005 | Du et al. |
| 2005/0048916 A1 | 3/2005 | Suh |
| 2005/0055405 A1 | 3/2005 | Kaminsky et al. |
| 2005/0055412 A1 | 3/2005 | Kaminsky et al. |
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0131774 A1 | 6/2005 | Huxter |
| 2005/0175208 A1 | 8/2005 | Shaw et al. |
| 2005/0215229 A1 | 9/2005 | Cheng |
| 2005/0226511 A1 | 10/2005 | Short |
| 2005/0231588 A1 | 10/2005 | Yang et al. |
| 2005/0286711 A1 | 12/2005 | Lee et al. |
| 2006/0004911 A1 | 1/2006 | Becker et al. |
| 2006/0020697 A1 | 1/2006 | Kelso et al. |
| 2006/0026255 A1 | 2/2006 | Malamud et al. |
| 2006/0083305 A1 | 4/2006 | Dougherty et al. |
| 2006/0084471 A1 | 4/2006 | Walter |
| 2006/0164552 A1 | 7/2006 | Cutler |
| 2006/0224430 A1 | 10/2006 | Butt |
| 2006/0250987 A1 | 11/2006 | White et al. |
| 2006/0271624 A1 | 11/2006 | Lyle et al. |
| 2007/0005752 A1 | 1/2007 | Chawla et al. |
| 2007/0021973 A1 | 1/2007 | Stremler |
| 2007/0025576 A1 | 2/2007 | Wen |
| 2007/0041366 A1 | 2/2007 | Vugenfirer et al. |
| 2007/0047707 A1 | 3/2007 | Mayer et al. |
| 2007/0058842 A1 | 3/2007 | Vallone et al. |
| 2007/0067387 A1 | 3/2007 | Jain et al. |
| 2007/0091831 A1 | 4/2007 | Croy et al. |
| 2007/0100986 A1 | 5/2007 | Bagley et al. |
| 2007/0106747 A1 | 5/2007 | Singh et al. |
| 2007/0116225 A1 | 5/2007 | Zhao et al. |
| 2007/0139626 A1 | 6/2007 | Saleh et al. |
| 2007/0150453 A1 | 6/2007 | Morita |
| 2007/0168444 A1 | 7/2007 | Chen et al. |
| 2007/0198637 A1 | 8/2007 | Deboy et al. |
| 2007/0208590 A1 | 9/2007 | Dorricott et al. |
| 2007/0248244 A1 | 10/2007 | Sato et al. |
| 2007/0250567 A1 | 10/2007 | Graham et al. |
| 2008/0059986 A1 | 3/2008 | Kalinowski et al. |
| 2008/0068447 A1 | 3/2008 | Mattila et al. |
| 2008/0071868 A1 | 3/2008 | Arenburg et al. |
| 2008/0080532 A1 | 4/2008 | O'Sullivan et al. |
| 2008/0107255 A1 | 5/2008 | Geva et al. |
| 2008/0133663 A1 | 6/2008 | Lentz |
| 2008/0154863 A1 | 6/2008 | Goldstein |
| 2008/0209452 A1 | 8/2008 | Ebert et al. |
| 2008/0270211 A1 | 10/2008 | Vander Veen et al. |
| 2008/0278894 A1 | 11/2008 | Chen et al. |
| 2009/0012963 A1 | 1/2009 | Johnson et al. |
| 2009/0019374 A1 | 1/2009 | Logan et al. |
| 2009/0049151 A1 | 2/2009 | Pagan |
| 2009/0064245 A1 | 3/2009 | Facemire et al. |
| 2009/0075633 A1 | 3/2009 | Lee et al. |
| 2009/0089822 A1 | 4/2009 | Wada |
| 2009/0094088 A1 | 4/2009 | Chen et al. |
| 2009/0100142 A1 | 4/2009 | Stern et al. |
| 2009/0119373 A1 | 5/2009 | Denner et al. |
| 2009/0132949 A1 | 5/2009 | Bosarge |
| 2009/0193327 A1 | 7/2009 | Roychoudhuri et al. |
| 2009/0195402 A1 | 8/2009 | Izadi et al. |
| 2009/0234667 A1 | 9/2009 | Thayne |
| 2009/0254619 A1 | 10/2009 | Kho et al. |
| 2009/0256901 A1 | 10/2009 | Mauchly et al. |
| 2009/0278851 A1 | 11/2009 | Ach et al. |
| 2009/0282104 A1 | 11/2009 | O'Sullivan et al. |
| 2009/0292999 A1 | 11/2009 | LaBine et al. |
| 2009/0296908 A1 | 12/2009 | Lee et al. |
| 2009/0306981 A1 | 12/2009 | Cromack et al. |
| 2009/0309846 A1 | 12/2009 | Trachtenberg et al. |
| 2009/0313334 A1 | 12/2009 | Seacat et al. |
| 2010/0005142 A1 | 1/2010 | Xiao et al. |
| 2010/0005402 A1 | 1/2010 | George et al. |
| 2010/0031192 A1 | 2/2010 | Kong |
| 2010/0061538 A1 | 3/2010 | Coleman et al. |
| 2010/0070640 A1 | 3/2010 | Allen, Jr. et al. |
| 2010/0073454 A1 | 3/2010 | Lovhaugen et al. |
| 2010/0077109 A1 | 3/2010 | Yan et al. |
| 2010/0094867 A1 | 4/2010 | Badros et al. |
| 2010/0095327 A1 | 4/2010 | Fujinaka et al. |
| 2010/0121959 A1 | 5/2010 | Lin et al. |
| 2010/0131856 A1 | 5/2010 | Kalbfleisch et al. |
| 2010/0157978 A1 | 6/2010 | Robbins et al. |
| 2010/0162170 A1 | 6/2010 | Johns et al. |
| 2010/0183179 A1 | 7/2010 | Griffin, Jr. et al. |
| 2010/0211872 A1 | 8/2010 | Rolston et al. |
| 2010/0215334 A1 | 8/2010 | Miyagi |
| 2010/0220615 A1 | 9/2010 | Enstrom et al. |
| 2010/0241691 A1 | 9/2010 | Savitzky et al. |
| 2010/0245535 A1 | 9/2010 | Mauchly |
| 2010/0250817 A1 | 9/2010 | Collopy et al. |
| 2010/0262266 A1 | 10/2010 | Chang et al. |
| 2010/0262925 A1 | 10/2010 | Liu et al. |
| 2010/0275164 A1 | 10/2010 | Morikawa |
| 2010/0302033 A1 | 12/2010 | Devenyi et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0072037 A1 | 3/2011 | Lotzer |
| 2011/0075830 A1 | 3/2011 | Dreher et al. |
| 2011/0087745 A1 | 4/2011 | O'Sullivan et al. |
| 2011/0117535 A1 | 5/2011 | Benko et al. |
| 2011/0131498 A1 | 6/2011 | Chao et al. |
| 2011/0154427 A1 | 6/2011 | Wei |
| 2011/0167357 A1* | 7/2011 | Benjamin ......... H04M 1/72457 715/753 |
| 2011/0196868 A1 | 8/2011 | Hans et al. |
| 2011/0230209 A1 | 9/2011 | Kilian |

(56) References Cited

U.S. PATENT DOCUMENTS

| | | |
|---|---|---|
| 2011/0264928 A1 | 10/2011 | Hinckley |
| 2011/0270609 A1 | 11/2011 | Jones et al. |
| 2011/0271211 A1 | 11/2011 | Jones et al. |
| 2011/0283226 A1 | 11/2011 | Basson et al. |
| 2011/0314139 A1 | 12/2011 | Song et al. |
| 2012/0009890 A1 | 1/2012 | Curcio et al. |
| 2012/0013704 A1 | 1/2012 | Sawayanagi et al. |
| 2012/0013768 A1 | 1/2012 | Zurek et al. |
| 2012/0026279 A1 | 2/2012 | Kato |
| 2012/0054288 A1 | 3/2012 | Wiese et al. |
| 2012/0072364 A1 | 3/2012 | Ho |
| 2012/0079399 A1 | 3/2012 | Ferman et al. |
| 2012/0084714 A1 | 4/2012 | Sirpal et al. |
| 2012/0092436 A1 | 4/2012 | Pahud et al. |
| 2012/0140970 A1 | 6/2012 | Kim et al. |
| 2012/0179502 A1 | 7/2012 | Farooq et al. |
| 2012/0185291 A1* | 7/2012 | Ramaswamy ..... G06Q 10/1095 705/7.19 |
| 2012/0190386 A1 | 7/2012 | Anderson |
| 2012/0192075 A1 | 7/2012 | Ebtekar et al. |
| 2012/0233020 A1 | 9/2012 | Eberstadt et al. |
| 2012/0246229 A1 | 9/2012 | Carr et al. |
| 2012/0246596 A1 | 9/2012 | Ording et al. |
| 2012/0284635 A1 | 11/2012 | Sitrick et al. |
| 2012/0296957 A1 | 11/2012 | Stinson et al. |
| 2012/0303476 A1 | 11/2012 | Krzyzanowski et al. |
| 2012/0306757 A1 | 12/2012 | Keist et al. |
| 2012/0306993 A1 | 12/2012 | Sellers-Blais |
| 2012/0308202 A1 | 12/2012 | Murata et al. |
| 2012/0313971 A1 | 12/2012 | Murata et al. |
| 2012/0315011 A1 | 12/2012 | Messmer et al. |
| 2012/0321058 A1 | 12/2012 | Eng et al. |
| 2012/0323645 A1 | 12/2012 | Spiegel et al. |
| 2012/0324512 A1 | 12/2012 | Cahnbley et al. |
| 2013/0027425 A1 | 1/2013 | Yuan |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0055112 A1 | 2/2013 | Joseph et al. |
| 2013/0061054 A1 | 3/2013 | Niccolai |
| 2013/0063542 A1 | 3/2013 | Bhat et al. |
| 2013/0086633 A1 | 4/2013 | Schultz |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0094647 A1 | 4/2013 | Mauro et al. |
| 2013/0113602 A1 | 5/2013 | Gilbertson et al. |
| 2013/0113827 A1 | 5/2013 | Forutanpour et al. |
| 2013/0120522 A1 | 5/2013 | Lian et al. |
| 2013/0124551 A1 | 5/2013 | Foo |
| 2013/0129252 A1 | 5/2013 | Lauper et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0182063 A1 | 7/2013 | Jaiswal et al. |
| 2013/0185672 A1 | 7/2013 | McCormick et al. |
| 2013/0198629 A1 | 8/2013 | Tandon et al. |
| 2013/0210496 A1 | 8/2013 | Zakarias et al. |
| 2013/0211826 A1 | 8/2013 | Mannby |
| 2013/0212202 A1 | 8/2013 | Lee |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0235866 A1 | 9/2013 | Tian et al. |
| 2013/0242030 A1 | 9/2013 | Kato et al. |
| 2013/0243213 A1 | 9/2013 | Moquin |
| 2013/0252669 A1 | 9/2013 | Nhiayi |
| 2013/0263020 A1 | 10/2013 | Heiferman et al. |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0325970 A1 | 12/2013 | Roberts et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040404 A1 | 2/2014 | Pujare et al. |
| 2014/0040819 A1 | 2/2014 | Duffy |
| 2014/0063174 A1 | 3/2014 | Junuzovic et al. |
| 2014/0068452 A1 | 3/2014 | Joseph et al. |
| 2014/0068670 A1 | 3/2014 | Timmermann et al. |
| 2014/0078182 A1 | 3/2014 | Utsunomiya |
| 2014/0108084 A1* | 4/2014 | Bargetzi ............... H04L 63/105 705/7.19 |
| 2014/0108486 A1 | 4/2014 | Borzycki et al. |
| 2014/0111597 A1 | 4/2014 | Anderson et al. |
| 2014/0136630 A1 | 5/2014 | Siegel et al. |
| 2014/0157338 A1 | 6/2014 | Pearce |
| 2014/0161243 A1 | 6/2014 | Contreras et al. |
| 2014/0195557 A1 | 7/2014 | Oztaskent et al. |
| 2014/0198175 A1 | 7/2014 | Shaffer et al. |
| 2014/0237371 A1 | 8/2014 | Klemm et al. |
| 2014/0253671 A1 | 9/2014 | Bentley et al. |
| 2014/0280595 A1 | 9/2014 | Mani et al. |
| 2014/0282213 A1 | 9/2014 | Musa et al. |
| 2014/0296112 A1 | 10/2014 | O'Driscoll et al. |
| 2014/0298210 A1 | 10/2014 | Park et al. |
| 2014/0317561 A1 | 10/2014 | Robinson et al. |
| 2014/0337840 A1 | 11/2014 | Hyde et al. |
| 2014/0358264 A1 | 12/2014 | Long et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Nakatomi et al. |
| 2015/0067552 A1 | 3/2015 | Leorin et al. |
| 2015/0070835 A1 | 3/2015 | Mclean |
| 2015/0074189 A1 | 3/2015 | Cox et al. |
| 2015/0081885 A1 | 3/2015 | Thomas et al. |
| 2015/0082350 A1 | 3/2015 | Ogasawara et al. |
| 2015/0085060 A1 | 3/2015 | Fish et al. |
| 2015/0088575 A1 | 3/2015 | Asli et al. |
| 2015/0089393 A1 | 3/2015 | Zhang et al. |
| 2015/0089394 A1 | 3/2015 | Chen et al. |
| 2015/0111552 A1* | 4/2015 | Kaye ................. G06Q 10/1093 455/416 |
| 2015/0113050 A1 | 4/2015 | Stahl |
| 2015/0113369 A1 | 4/2015 | Chan et al. |
| 2015/0128068 A1 | 5/2015 | Kim |
| 2015/0172120 A1 | 6/2015 | Dwarampudi et al. |
| 2015/0178626 A1 | 6/2015 | Pielot et al. |
| 2015/0215365 A1 | 7/2015 | Shaffer et al. |
| 2015/0254760 A1 | 9/2015 | Pepper |
| 2015/0288774 A1 | 10/2015 | Larabie-Belanger |
| 2015/0301691 A1 | 10/2015 | Qin |
| 2015/0304120 A1 | 10/2015 | Xiao et al. |
| 2015/0304121 A1* | 10/2015 | Wu ....................... H04L 65/403 709/204 |
| 2015/0304366 A1 | 10/2015 | Bader-Natal et al. |
| 2015/0319113 A1 | 11/2015 | Gunderson et al. |
| 2015/0326704 A1 | 11/2015 | Ko et al. |
| 2015/0350126 A1 | 12/2015 | Xue |
| 2015/0373063 A1 | 12/2015 | Vashishtha et al. |
| 2015/0373414 A1 | 12/2015 | Kinoshita |
| 2016/0037129 A1 | 2/2016 | Tangeland et al. |
| 2016/0037304 A1 | 2/2016 | Dunkin et al. |
| 2016/0043986 A1 | 2/2016 | Ronkainen |
| 2016/0044159 A1 | 2/2016 | Wolff et al. |
| 2016/0044380 A1 | 2/2016 | Barrett |
| 2016/0050079 A1 | 2/2016 | Martin De Nicolas et al. |
| 2016/0050160 A1 | 2/2016 | Li et al. |
| 2016/0050175 A1 | 2/2016 | Chaudhry et al. |
| 2016/0050394 A1 | 2/2016 | Segal |
| 2016/0070758 A1 | 3/2016 | Thomson et al. |
| 2016/0071056 A1 | 3/2016 | Ellison et al. |
| 2016/0072862 A1 | 3/2016 | Bader-Natal et al. |
| 2016/0094593 A1 | 3/2016 | Priya |
| 2016/0105345 A1 | 4/2016 | Kim et al. |
| 2016/0105553 A1* | 4/2016 | Forrester ............. H04L 12/1822 455/416 |
| 2016/0110056 A1 | 4/2016 | Hong et al. |
| 2016/0156773 A1 | 6/2016 | Chanda |
| 2016/0165056 A1 | 6/2016 | Bargetzi et al. |

(56) References Cited

U.S. PATENT DOCUMENTS

| | | | |
|---|---|---|---|
| 2016/0173537 | A1 | 6/2016 | Kumar et al. |
| 2016/0182580 | A1 | 6/2016 | Nayak |
| 2016/0266609 | A1 | 9/2016 | McCracken |
| 2016/0269411 | A1 | 9/2016 | Malachi |
| 2016/0277461 | A1 | 9/2016 | Sun et al. |
| 2016/0283909 | A1 | 9/2016 | Adiga |
| 2016/0307165 | A1 | 10/2016 | Grodum et al. |
| 2016/0309037 | A1 | 10/2016 | Rosenberg et al. |
| 2016/0321347 | A1 | 11/2016 | Zhou et al. |
| 2017/0006162 | A1 | 1/2017 | Bargetzi et al. |
| 2017/0006446 | A1 | 1/2017 | Harris et al. |
| 2017/0070706 | A1 | 3/2017 | Ursin et al. |
| 2017/0093874 | A1 | 3/2017 | Uthe |
| 2017/0099361 | A1 | 4/2017 | Digilov et al. |
| 2017/0104961 | A1 | 4/2017 | Pan et al. |
| 2017/0171260 | A1 | 6/2017 | Jerrard-Dunne et al. |
| 2017/0264446 | A1* | 9/2017 | Rose ................. H04M 3/56 |
| 2017/0324850 | A1 | 11/2017 | Snyder et al. |
| 2017/0372223 | A1* | 12/2017 | Vaughn ............. G06F 16/9535 |
| 2018/0152487 | A1 | 5/2018 | Griffin et al. |
| 2018/0288004 | A1 | 10/2018 | Fei et al. |

FOREIGN PATENT DOCUMENTS

| | | |
|---|---|---|
| CN | 102572370 | 7/2012 |
| CN | 102655583 | 9/2012 |
| CN | 101729528 | 11/2012 |
| CN | 102938834 | 2/2013 |
| CN | 103141086 | 6/2013 |
| CN | 204331453 | 5/2015 |
| DE | 3843033 | 9/1991 |
| EP | 959585 | 11/1999 |
| EP | 2773131 | 9/2014 |
| WO | WO 98/55903 | 12/1998 |
| WO | WO 2008/139269 | 11/2008 |
| WO | WO 2012/167262 | 12/2012 |
| WO | WO 2014/118736 | 8/2014 |
| WO | 2015047216 | 4/2015 |

OTHER PUBLICATIONS

Author Unknown, "Active screen follows mouse and dual monitors," KDE Community Forums, Apr. 13, 2010, 3 pages.
Author Unknown, "Implementing Media Gateway Control Protocols" A RADVision White Paper, Jan. 27, 2002, 16 pages.
Averusa, "Interactive Video Conferencing K-12 applications," "Interactive Video Conferencing K-12 applications" copyright 2012. http://www.averusa.com/education/downloads/hvc brochure goved.pdf (last Accessed Oct. 11, 2013).
Choi, Jae Young, et al; "Towards an Automatic Face Indexing System for Actor-based Video Services in an IPTV Environment," IEEE Transactions on 56, No. 1 (2010): 147-155.
Cisco Systems, Inc. "Cisco webex: WebEx Meeting Center User Guide for Hosts, Presenters, and Participants" © 1997-2013, pp. 1-394 plus table of contents.
Cisco Systems, Inc., "Cisco Webex Meetings for iPad and iPhone Release Notes," Version 5.0, Oct. 2013, 5 pages.
Cisco Systems, Inc., "Cisco WebEx Meetings Server System Requirements release 1.5." 30 pages, Aug. 14, 2013.
Cisco Systems, Inc., "Cisco Unified Personal Communicator 8.5", 2011, 9 pages.
Cisco White Paper, "Web Conferencing: Unleash the Power of Secure, Real-Time Collaboration," pp. 1-8, 2014.
Clarke, Brant, "Polycom Announces RealPresence Group Series," "Polycom Announces RealPresence Group Series" dated Oct. 8, 2012 available at http://www.323.tv/news/polycom-realpresence-group-series (last accessed Oct. 11, 2013).
Clauser, Grant, et al., "Is the Google Home the voice-controlled speaker for you?," The Wire Cutter, Nov. 22, 2016, pp. 1-15.
Cole, Camille, et al., "Videoconferencing for K-12 Classrooms," Second Edition (excerpt), http://www.iste.org/docs/excerpts/VIDCO2-excerpt.pdf (last accessed 1011-2013), 2009.
Eichen, Elliot, et al., "Smartphone Docking Stations and Strongly Converged VoIP Clients for Fixed-Mobile convergence," IEEE Wireless Communications and Networking Conference: Services, Applications and Business, 2012, pp. 3140-3144.
Epson, "BrightLink Pro Projector," BrightLink Pro Projector. http://www.epson.com/cgi-bin/Store/jsp/Landing/brightlink-pro-interactive-projectors.do?ref=van brightlink-pro—dated 2013 (last Accessed 10-112013).
Grothaus, Michael, "How Interactive Product Placements Could Save Television," Jul. 25, 2013, 4 pages.
Hannigan, Nancy Kruse, et al., The IBM Lotus Samteime VB Family Extending the IBM Unified Communications and Collaboration Strategy (2007), available at http://www.ibm.com/developerworks/lotus/library/sametime8-new/, 10 pages.
Hirschmann, Kenny, "TWIDDLA: Smarter Than the Average Whiteboard," Apr. 17, 2014, 2 pages.
Infocus, "Mondopad," Mondopad. http://www.infocus.com/sites/default/files/InFocus-Mondopad-INF5520a-INF7021-Datasheet-EN.pdf (last accessed Oct. 11, 2013), 2013.
MacCormick, John, "Video Chat with Multiple Cameras," CSCW '13, Proceedings of the 2013 conference on Computer supported cooperative work companion, pp. 195-198, ACM, New York, NY, USA, 2013.
Microsoft, "Positioning Objects on Multiple Display Monitors," Aug. 12, 2012, 2 pages.
Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900680 dated Oct. 12, 2011 (last accessed Oct. 11, 2013).
Nu-Star Technologies, "Interactive Whiteboard Conferencing," Interactive Whiteboard Conferencing. http://www.nu-star.com/interactive-conf.php dated 2013 (last accessed Oct. 11, 2013).
Nyamgondalu, Nagendra, "Lotus Notes Calendar and Scheduling Explained!" IBM, Oct. 18, 2004, 10 pages.
Polycom, "Polycom RealPresence Mobile: Mobile Telepresence & Video Conferencing," http://www.polycom.com/products-services/hd-telepresence-video-conferencing/realpresence-mobile.html#stab1 (last accessed Oct. 11, 2013), 2013.
Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom.com/company/news/press-releases/2011/20111027 2.html—dated Oct. 27, 2011.
Polycom, "Polycom UC Board, Transforming ordinary surfaces into virtual whiteboards" 2012, Polycom, Inc., San Jose, CA, http://www.uatg.com/pdf/polycom/polycom-uc-board-datasheet.pdf, (last accessed Oct. 11, 2013).
Schreiber, Danny, "The Missing Guide for Google Hangout Video Calls," Jun. 5, 2014, 6 pages.
Shervington, Martin, "Complete Guide to Google Hangouts for Businesses and Individuals," Mar. 20, 2014, 15 pages.
Shi, Saiqi, et al, "Notification That a Mobile Meeting Attendee is Driving", May 20, 2013, 13 pages.
Stodle. Daniel, et al., "Gesture-Based, Touch-Free Multi-User Gaming on Wall-Sized, High-Resolution Tiled Displays," 2008, 13 pages.
Thompson, Phil, et al., "Agent Based Ontology Driven Virtual Meeting Assistant," Future Generation Information Technology, Springer Berlin Heidelberg, 2010, 4 pages.
Tno, "Multi-Touch Interaction Overview," Dec. 1, 2009, 12 pages.
Toga, James, et al., "Demystifying Multimedia Conferencing Over the Internet Using the H.323 Set of Standards," Intel Technology Journal Q2, 1998, 11 pages.
Ubuntu, "Force Unity to open new window on the screen where the cursor is?" Sep. 16, 2013, 1 page.
VB Forums, "Pointapi," Aug. 8, 2001, 3 pages.
Vidyo, "VidyoPanorama," VidyoPanorama-http://www.vidyo.com/products/vidyopanorama/ dated 2013 last accessed Oct. 11, 2013).
Communication pursuant to Article 94(3) EPC, issued by European Patent Office dated Apr. 9, 2020, 8 pages, for the corresponding European Patent Application No. 17829394.0.

(56) References Cited

OTHER PUBLICATIONS

International Search Report and Written Opinion from the International Searching Authority, dated Feb. 19, 2018, 13 pages, for the corresponding International Application No. PCT/US2017/066016.

* cited by examiner

400

INITIATING A CONFERENCING MEETING USING A CONFERENCE ROOM DEVICE

CROSS REFERENCE TO RELATED APPLICATIONS

This application is a continuation of U.S. patent application Ser. No. 15/435,892 filed on Feb. 17, 2017, which claims the benefit of U.S. Provisional Patent Application Ser. No. 62/434,805 filed on Dec. 15, 2016, the contents of which are incorporated by reference in their entireties.

TECHNICAL FIELD

The present disclosure pertains to multiparty conferencing, and more specifically to use of a conference room device to aid multiparty conferencing.

BACKGROUND

Multiparty conferencing allows participants from multiple locations to collaborate. For example, participants from multiple geographic locations can join a conference meeting and communicate with each other to discuss issues, share ideas, etc. These collaborative sessions often include two-way audio transmissions. However, in some cases, the meetings may also include one or two-way video transmissions as well as tools for the sharing of content presented by one participant to other participants. Thus, conference meetings can simulate in-person interactions between people.

Conferencing sessions are typically started by having users in each geographic location turn on some conferencing equipment (e.g., a telephone, computer, or video conferencing equipment), inputting a conference number into the equipment, and instructing the conferencing equipment to dial that number.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

OVERVIEW

The disclosed technology addresses the need in the art for a conference room device configured to aid the initiation, organization, and management of a conference meeting.

Multiparty conferencing technologies simulate in-person interactions and allow participants from multiple geographic locations to collaborate. However, setting a conferencing session or conference meeting up and starting the session is complicated and often takes a number of steps performed by one or all meeting participants. Before each session, each geographic location that will be represented in the conferencing session typically needs to set up all equipment (e.g., audio equipment, video equipment, presentation equipment) so that they are able to work together. When the session is about to begin, a user at each geographic location needs to follow a set of instructions to start the session at that location and "join the meeting."

Various aspects of the subject technology relate to facilitating the setting up or initiation of a conferencing session by detecting when a user comes within range of a conference room device, determining that there is a meeting for the user, and prompting the user to start the meeting. If the user indicates that the user wishes to start the meeting, various embodiments of the subject technology will work to start the conferencing session. By predicting that the user will want to join a conferencing session and proactively prompting the user to begin the conferencing session, various embodiments of the subject technology aid the user in setting up and initiating the conferencing session. The user experience is greatly improved with a simpler, faster, and more intuitive process for initiating the conferencing session.

DETAILED DESCRIPTION

Figure 1:
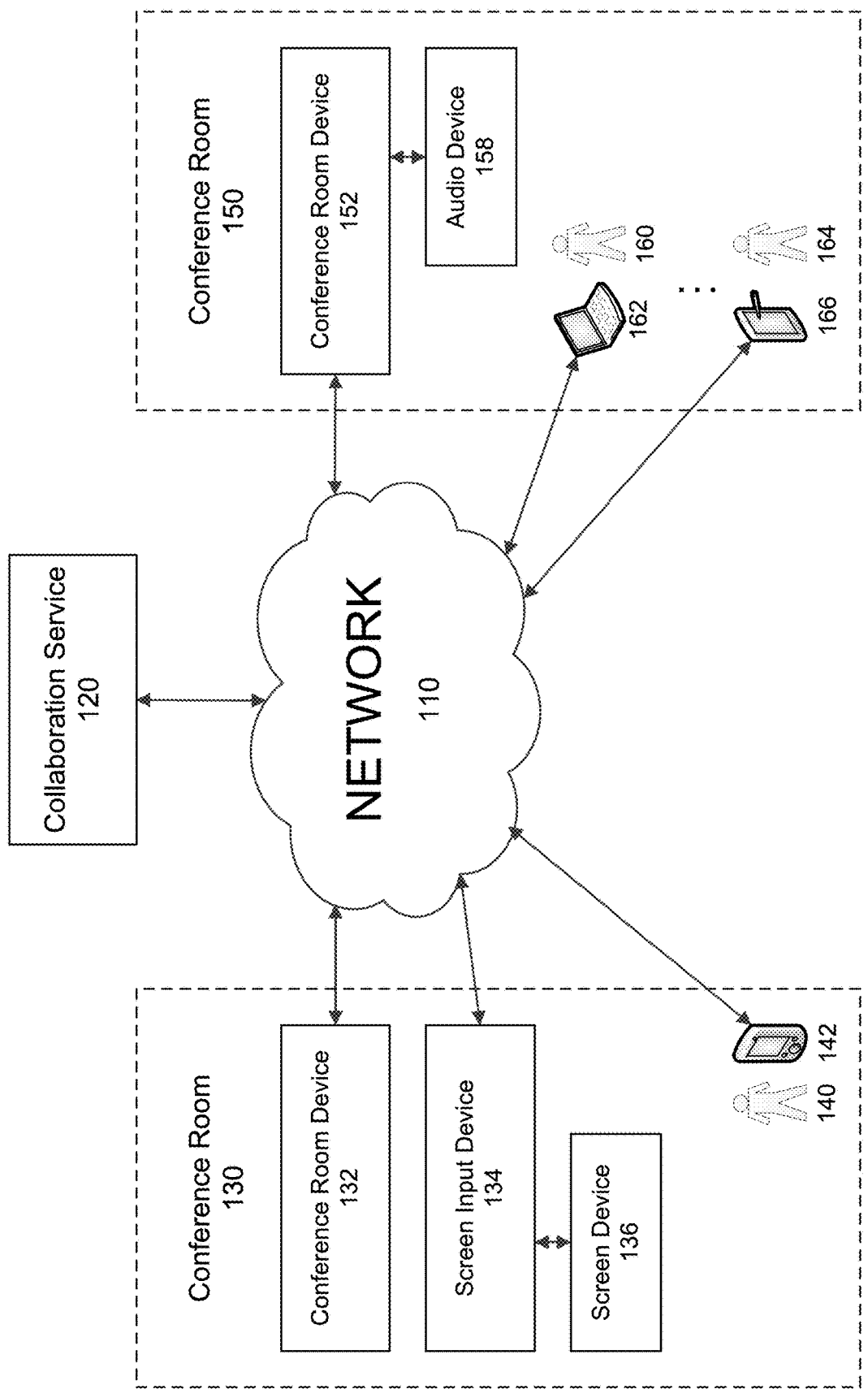
FIG. 1 is a conceptual block diagram illustrating an example network environment for providing conferencing capabilities, in accordance with various embodiments of the subject technology.

FIG. 1 is a conceptual block diagram illustrating an example network environment 100 for providing conferencing capabilities, in accordance with various embodiments of the subject technology. Although FIG. 1 illustrates a client-server network environment 100, other embodiments of the subject technology may include other configurations including, for example, peer-to-peer environments.

The network environment 100 includes at least one collaboration service 120 server that is in communication with devices from one or more geographic locations. In FIG. 1, the geographic locations include conference room 130 and conference room 150. However, as will be appreciated by those skilled in the art, the communication devices do not necessarily need to be in a room.

The various devices and the collaboration service 120 communicate via a network 110 (e.g., the Internet). The network 110 can be any type of network and may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like. Network 110 can be a public network, a private network, or a combination thereof. Communication network 110 may be implemented using any number of communications links associated with one or more service providers, including one or more wired communication links, one or more wireless communication links, or any combination thereof. Additionally, network 110 can be configured to support the transmission of data formatted using any number of protocols.

Conference room 130 includes a conference room device 132, a screen input device 134 (or a screen assistive device), and a screen device 136. The screen device 136 may be a monitor, a television, a projector, a tablet screen, or other visual device that may be used during the conferencing session. The screen input device 134 is configured to interface with the screen device 136 and provide the conferencing session input for the screen device 136. The screen input device 134 may be integrated into the screen device or separate from the screen input device 134 and communicate with the screen input device via a Universal Serial Bus (USB) interface, a High-Definition Multimedia Interface (HDMI) interface, a computer display standard interface (e.g., Video Graphics Array (VGA), Extended Graphics Array (XGA), etc.), a wireless interface (e.g., Wi-Fi, infrared, Bluetooth, etc.), or other input or communication medium. In some embodiments, screen input device 134 may be integrated into conference room device 132.

The conference room device 132 is configured to detect when a user comes within range of the conference room 130, the conference room device 132, or some other geographic location marker. The conference room device 132 is further configured to coordinate with the other devices in the conference room 130 or geographical location and the collaboration service 120 to start and maintain a conferencing session. For example, the conference room device 132 may interact with a client device associated with one or more user to facilitate a conferencing session. The client device may be, for example, a user's smart phone, tablet, laptop, or other computing device.

As shown in FIG. 1, conference room 130 further includes one or more users 140. Each user may be associated with one or more client devices 142. The client devices 142 may include smart phones, tablets, laptop computers, conferencing devices, or other computing devices. The client devices 142 may have an operating system and run one or more collaboration applications that facilitate conferencing or collaboration. For example, a collaboration application running on a client device 142 may be configured to interface with the collaboration service 120 or the conference room device 132 in facilitating a conferencing session for a user.

Conference room 150 includes a conference room device 152, an audio device 158, one or more users (user 160 and user 164), and one or more client devices 162 and 166. Conference room 150 is not shown with a screen device or a screen input device because some geographic locations may not have access to these devices.

The audio device 158 may include one or more speakers, microphones, or other audio equipment that may be used during the conferencing session. The conference room device 152 is configured to interface with the audio device 158 and provide the conferencing session input for the audio device 158. The audio device 158 may be integrated into the conference room device 152 or separate from the conference room device 152 and communicate with the conference room device 152 via an audio cable interface, a Universal Serial Bus (USB) interface, a High-Definition Multimedia Interface (HDMI) interface, a wireless interface (e.g., Wi-Fi, infrared, Bluetooth, etc.), or other input or communication medium.

Figure 2:
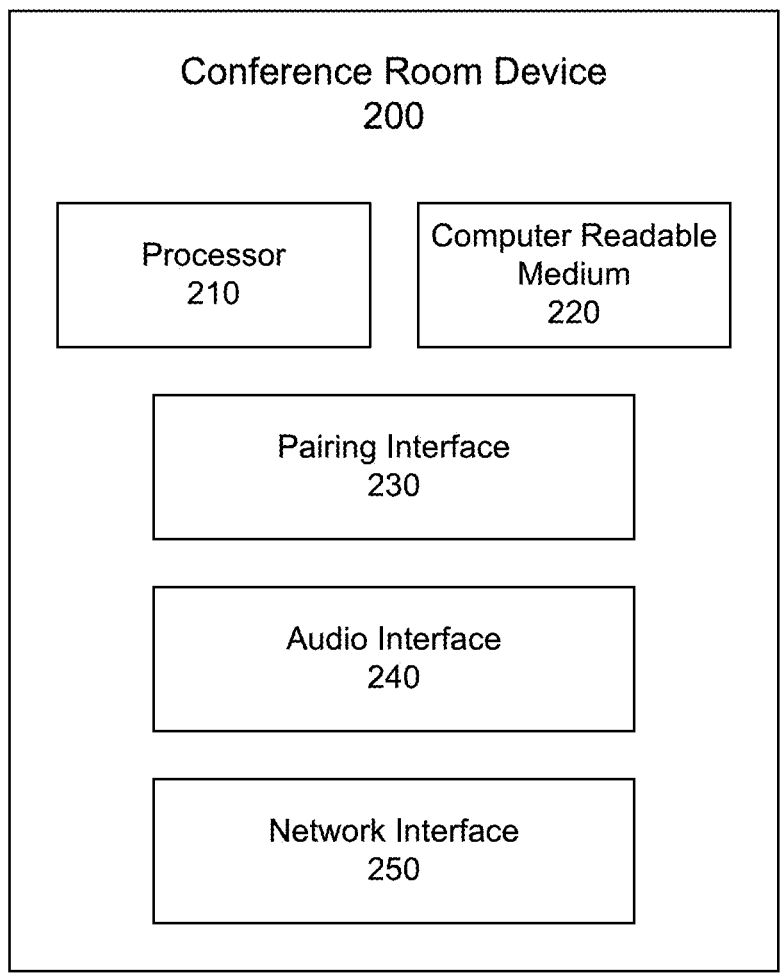
FIG. 2 is an illustration of a conference room device, in accordance with various embodiments.

FIG. 2 is an illustration of a conference room device 200, in accordance with various embodiments. The conference room device 200 may include a processor 210 and a computer-readable medium 220 storing instructions that, when executed by the conference room device 200, cause the conference room device 200 to perform various operations for facilitating a conferencing session. The conference room device 200 may further include a pairing interface 230, and audio interface, and a network interface 250. The network interface 250 may be configured to facilitate conferencing sessions by communicating with a collaboration service, screen input device, or client device.

The pairing interface 230 may be configured to detect when a user is within range of the conference room, the conference room device 200, or some other geographic location marker. For example, the pairing interface 230 may determine when the user is within a threshold distance of the conference room device 200 or when the user is within range of a sensor of the conference room device 200. The pairing interface may include one or more sensors including, an ultrasonic sensor, a time-of-flight sensor, a microphone, a Bluetooth sensor, a near-field communication (NFC) sensor, or other range determining sensors.

An ultrasonic sensor may be configured to generate sound waves. The sound waves may be high frequency (e.g., frequencies in the ultrasonic range that are beyond the range of human hearing). However, in other embodiments, other frequency ranges may be used. In some embodiments, the sound waves may be encoded with information such as a current time and a location identifier. The location identifier may be, for example, a conference room device 200 identifier, a geographic location name, coordinates, etc. The ultrasonic sound waves encoded with information may be considered an ultrasonic token.

A client device may detect the ultrasonic token and inform a collaboration service that the client device detected the ultrasonic token from the conference room device 200. The collaboration service may check the ultrasonic token to make sure the sound waves were received at the appropriate time and location. If the client device received the ultrasonic token at the appropriate time and location, the collaboration service may inform the conference room device 200 that the client device is within range and pair the conference room device 200 with the client device.

In other embodiments, the conference room device 200 and the client device may pair together directly, without the assistance of a collaboration service. Furthermore, in some embodiments, the roles are reversed where the client device emits high frequency sound waves and the ultrasonic sensor of the conference room device detects the high frequency sound waves from the client device. In still other embodiments, an ultrasonic sensor may be configured to generate high frequency sound waves, detect an echo which is received back after reflecting off a target, and calculate the time interval between sending the signal and receiving the echo to determine the distance to the target. A time-of-flight sensor may be configured to illuminate a scene (e.g., a conference room or other geographic location) with a modulated light source and observe the reflected light. The phase shift between the illumination and the reflection is measured and translated to distance.

The audio interface 240 may be configured to provide the audio component to the conferencing session. For example, the audio interface 240 may receive audio from participants in one geographic location of the conferencing session and play the audio from participants in another geographic location. The audio interface 240 may also be configured to facilitate the conferencing session by providing and receiving audio from meeting participants, client devices, or the collaboration service. In some embodiments, the audio interface 240 may prompt the user to start a meeting, prompt the user to end a meeting, prompt the user for instructions, or receive instructions from meeting participants. The audio interface 240 may include one or more speakers, microphones, or other audio equipment. In other embodiments, the audio interface 240 may interface with one or more speakers, microphones, or other audio devices external to the conference room device 200.

Figure 3:
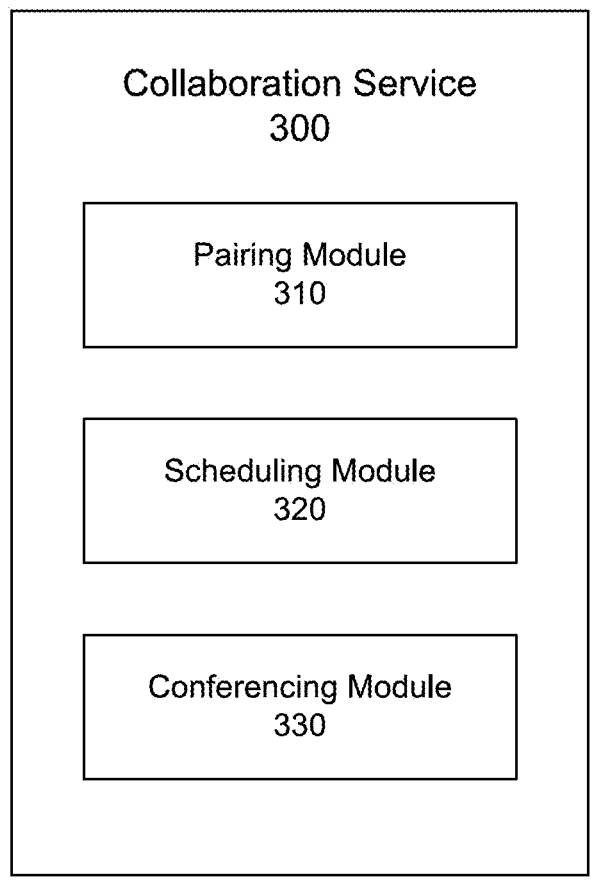
FIG. 3 is conceptual block diagram illustrating a collaboration service, in accordance with various embodiments.

FIG. 3 is conceptual block diagram illustrating a collaboration service 300, in accordance with various embodiments. The collaboration service may include a pairing module 310, a scheduling module 320, and a conferencing module 330.

The pairing module 310 may be configured to aid the pairing of a client device and a conference room device or the detection of a user within range of the conference room device. For example, the pairing module 310 may receive a communication from a client device indicating that the client device received an ultrasonic token from a conferencing room device. The pairing module 310 may decode the ultrasonic token and determine whether the client device received the ultrasonic token at the correct time and place. If the ultrasonic token does not match the appropriate time and place, the pairing module 310 may prevent pairing of the client device and the conferencing room device. If the ultrasonic token matches the appropriate time and place, the pairing module 310 may pair the client device and the conferencing room device. The pairing of the client device and the conferencing room device signifies that the client device and the user associated with the client device are within range of the conference room device.

A scheduling module 320 is configured to identify an appropriate meeting to start based on the paired devices. As will be discussed in further detail below, the scheduling module 320 may identify a user associated with the client device paired with a conference room device at a particular geographic location. The scheduling module 320 may access an electronic calendar for the conference room device at the geographic location, an electronic calendar for the user, or both to determine whether there is a conference meeting or session scheduled for the current time. If there is a meeting or session scheduled, the scheduling module 320 may ask the user if the user wants to start the meeting or session. For example, the scheduling module 320 may instruct the conference room device to prompt the user to start the meeting or instruct a collaboration application on the client device to prompt the user to start the meeting.

An electronic calendar may include a schedule or series of entries for the user, a conference room device, a conference room, or any other resource associated with a conference meeting. Each entry may signify a meeting or collaboration session and include a date and time, a list of one or more participants, a list of one or more locations, or a list of one or more conference resources. The electronic calendar may be stored by the collaboration service 300 or a third party service and accessed by scheduling module 320.

A conferencing module 330 is configured to start and manage a conferencing session between two or more geographic locations. For example, the conference room device may prompt the user to start the meeting and receive a confirmation from the user to start the meeting. The conference room device may transmit the confirmation to the collaboration service 300 and the conferencing module 330 may initiate the conferencing session. In some embodiments, the conferencing module 330 may initiate the conferencing session after the scheduling module 320 identifies an appropriate meeting to start without receiving a confirmation from the user or prompting the user to start the meeting.

In some embodiments, the conference room device may receive and respond to instructions from a user. Instructions may be received by a microphone, other sensor, or interface. For example, the user may enter a room and say "Please start my meeting." The conference room device may receive the instructions via the microphone and transmit the instructions to the collaboration service 300. The collaboration service 300 may convert the speech to text using speech-to-text functionality or third-party service. The collaboration service 300 may user natural language processing to determine the user's intent to start a meeting, identify an appropriate calendar entry for the user or conference room, and start the meeting associated with the calendar entry. In some cases, the collaboration service 300 may further use text-to-speech functionality or service to provide responses back to the user via the conference room device.

Figure 4:
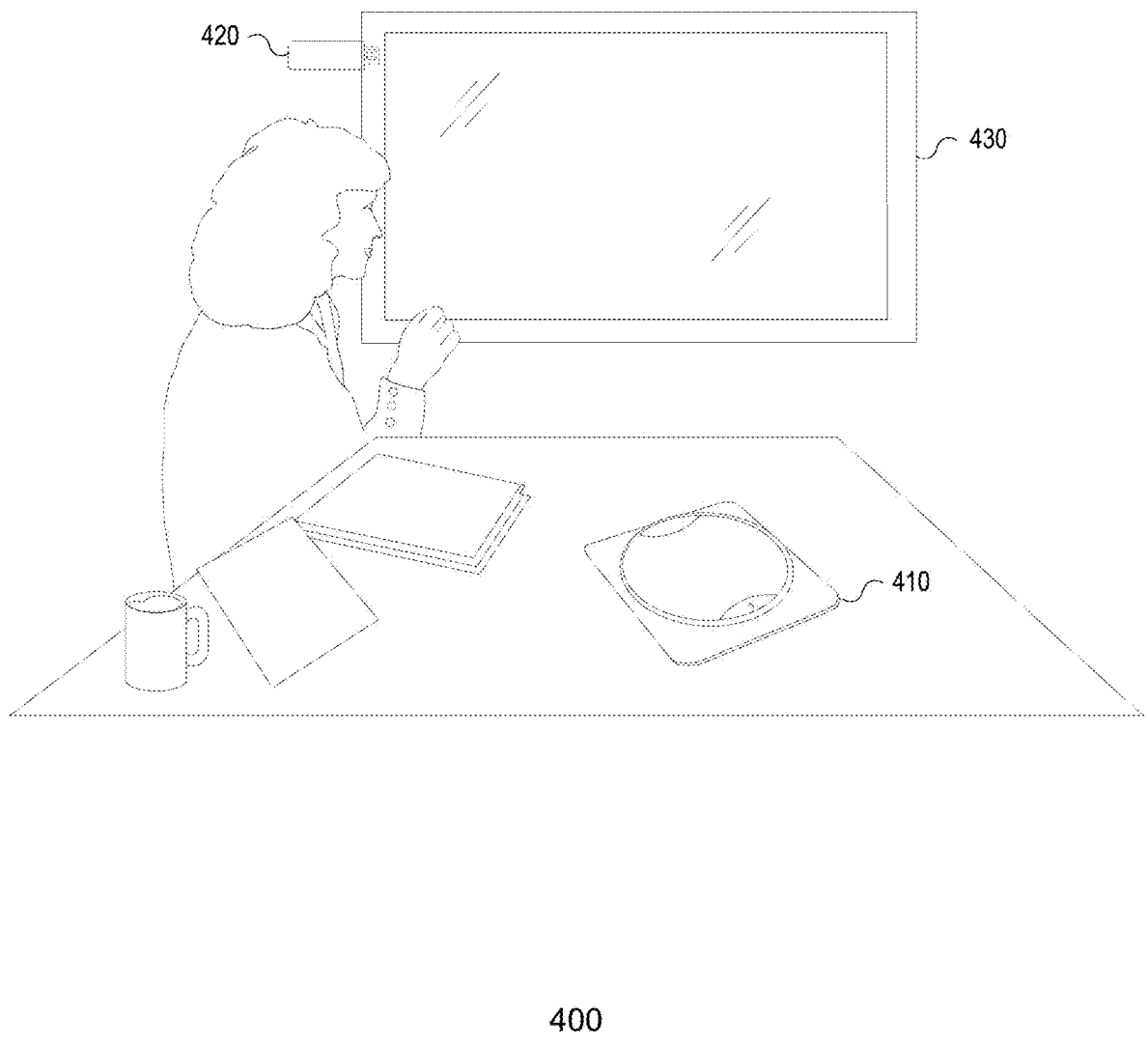
FIG. 4 shows an example conference room according to some embodiments.

FIG. 4 shows an example conference room 400 according to some embodiments. The conference room 400 is shown with a conference room device 410, a screen input device 420, and a screen device 430 located within the conference room 400. In other embodiments, however, conference room 400 may include additional devices (e.g., client devices, audio devices, additional screen devices, etc.), fewer devices, or alternative devices.

The conference room device 410 may be configured to pair with various devices and components in the conference room 400 in order to provide various capabilities for a collaboration session. For example, the conference room device 410 may be configured to pair with any audio devices in the conference room 400 or contain audio components (e.g., one or more speakers or microphones) to provide audio capability for the collaboration session. The conference room device 410 may also pair with a camera or the screen input device 420, which is connected to screen device 430, in order to provide video or presentation capabilities for the collaboration session. The conference room device 410 may be further configured to continue listening during a collaboration session and respond to voice activated commands.

As will be discussed in further detail below, the conference room device 410 may also automatically detect users within range of the conference room device 410, determine whether the user has a meeting, and ask the user to start a meeting. In this way, the conference room device 410 initiates the interaction with the user and guides the user through the initiation of the conference meeting.

Figure 5:
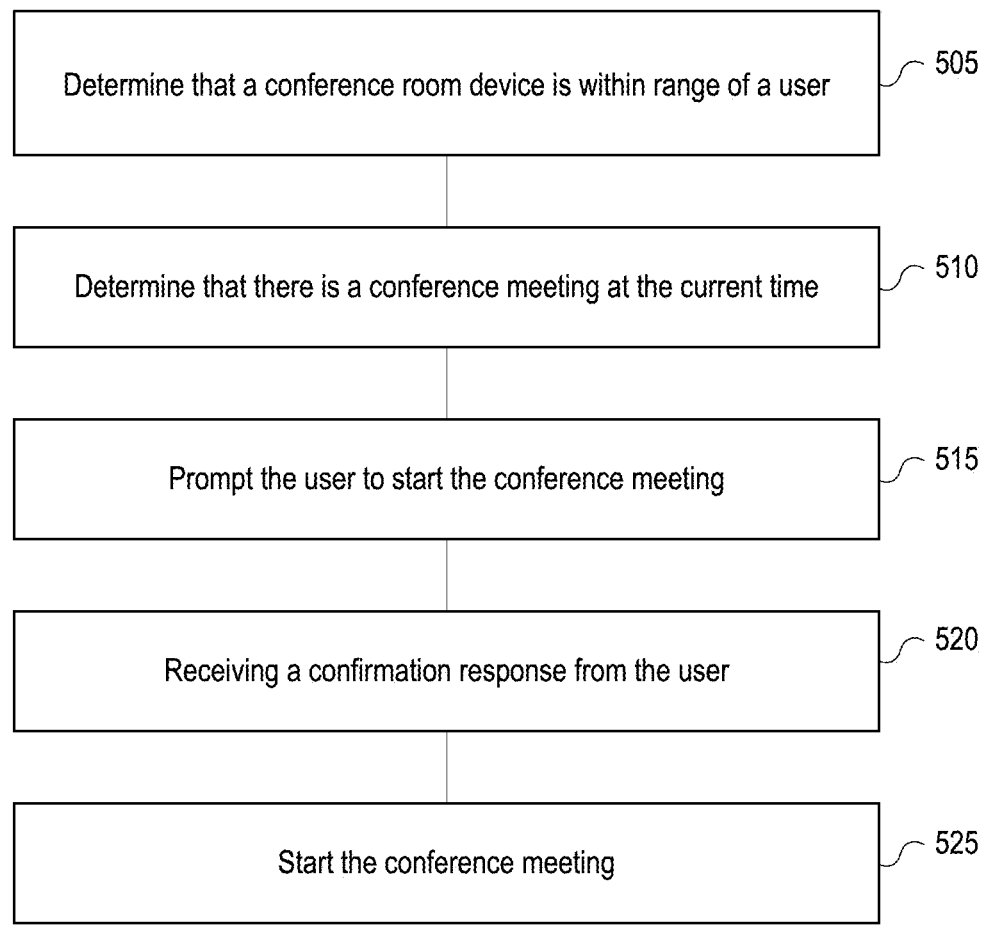
FIG. 5 shows an example method for starting a conference meeting according to some embodiments.

FIG. 5 shows an example method 500 for starting a conference meeting according to some embodiments. Although the methods and processes described herein may be shown with certain steps and operations in a particular order, additional, fewer, or alternative steps and operations performed in similar or alternative orders, or in parallel, are within the scope of various embodiments unless otherwise stated.

Method 500 may be implemented by a system which may include a conference room device, a collaboration service, or a combination thereof. At operation 505, the system determines that a conference room device is within range of a user based on a pairing interface of the conference room device. More specifically, in embodiments where the pairing interface is an ultrasonic sensor, the pairing interface may emit a token in the form of high frequency sound waves. The token may include encoded information such as a current time and location information (e.g., a location of the conference room the conference room device is located in or a conference room device identifier).

A user may be associated with a client device (e.g., a smart phone, tablet, laptop, or other device) running a collaboration application. The collaboration application may be logged in to an account for the user that is associated with the collaboration service. The collaboration application may utilize the components of the client device (e.g., a microphone or ultrasonic sensor) to listen for tokens. When the user of the client device comes within range of the conference room device, the collaboration application on the client device may detect and receive the token from the pairing interface of the conference room device.

In response to receiving the token from the pairing interface of the conference room device, the collaboration application on the client device may inform the collaboration service that it has received the token by translating the token and transmitting the encoded information to the collaboration service along with a user identifier (e.g., a user name or user account credentials). In other embodiments, the collaboration application on the client device may inform the collaboration service that it has received the token by transmitting the token to the collaboration service along with the user identifier.

If the collaboration service receives the decoded information from the client device, the collaboration service may confirm that the token is still valid (e.g., that the time encoded in the token is within a threshold time difference from the current time or that the token has not expired). On the other hand, if the collaboration service receives the token, the collaboration service may decode the token and confirm that the token is still valid. The collaboration service may determine whether the token is valid in order to make certain that the user and the user's client device are currently within range of the conference room device instead of merely being delayed in transmitting the token or token information.

At operation 510, the system determines that there is a conference meeting at the current time. In some embodiments, the collaboration service identifies a user account based on the user identifier and identifies the conference room device based on the information encoded in the token emitted by the conference room device. The scheduling module of the collaboration service may access one or more calendars associated with the user account, the conference room device, the conference room that the conference room device is located in, or a combination thereof.

Based on the accessed calendars, the collaboration service may determine whether the user is associated with a conference meeting at the current time. For example, the collaboration service may determine that the user is associated with a conference meeting at the current time based on an entry in the user's calendar at or near the current time, based on an entry in the calendar associated with the conference room or conference room device at or near the current time, or both.

At operation 515, the system prompts the user to start the conference meeting. In some embodiments, the collaboration service may transmit instructions to the conference room device to prompt the user to start the conference meeting. The conference room device may receive the instructions and prompt the user by audibly asking if the user wants to start the conference meeting via the audio interface of the conference room device. For example the audio interface may ask the user "We notice you have an upcoming meeting. Do you want to start your meeting?" In some embodiments, the prompt may include personalized information such as the user's name, the title of the meeting, or other participants of the meeting. Furthermore, in some embodiments, the prompt may also (or alternatively) be provided to the user visually via the screen input device or the application on the client device and the instructions to prompt the user may be transmitted by the conference room device or the collaboration service.

The user may respond to the prompt by speaking (e.g., by saying "Yes, start my meeting") or inputting a response into the collaboration application on the client device. The system receives the user's response at operation 520. The response may be received by the conference room device and transmitted to the collaboration service or received directly by the collaboration service (e.g., from the collaboration application on the client device).

If the response indicates that the user wishes to start the meeting (e.g., a confirmation response to the prompt), the collaboration service will start the conference meeting at operation 525. For example, the collaboration service may initiate two-way communication between the devices in the conference room and devices in conference rooms in one or more other geographic locations. Furthermore, the collaboration may enable additional conference meeting features such as recording, voice commands, video capabilities, shared screens, presentation abilities, or shared collaboration documents.

Although method 500 is described with respect to detecting that one user is within range of a conference room device, it will be appreciated by those in the art that additional users may be detected using similar processes. In some cases, the collaboration service may customize prompts or information provided to users based on the number of users detected. For example, if only one user is detected, the collaboration service may include more personalized information (e.g., the user's name) when communicating with the user.

According to some embodiments, the collaboration service may identify various signals in the calendar information that increase the reliability of a determination that the user is associated with a particular meeting at the current time. For example, there may be an entry in the calendar for the user at the current time and an entry in the calendar for the conference room device at the current time, the entry in the user's calendar may list the conference room or the conference room device as a location or participant, the entry in the calendar of the conference room device may list the user participant, the entries for the user and the conference room device may be part of the same meeting or conferencing session (e.g., they share a common meeting identifier), or the entries for the user and the conference room device may share common participants. Additional signals may be derived from calendar information from other users detected by the conference room device. For example, other detected users may have entries at the current time, the entries may list the first detected user as a participant, the entries may share common users in the participant list, the entries may list the conference room or the conference room device as a location or participant, or the entries may be part of the same meeting or conferencing session. The above information may aid the collaboration service in selecting a conference meeting and determining that the user is associated with the conference meeting.

However, not all calendar information may be consistent and there may be some ambiguity over what meeting is occurring at the current time. For example, the collaboration service may identify two or more entries at the current time in the calendar for the user, two or more entries at the current time in the calendar for the conference room device, or the entry for the conference room device may not list a detected user as a participant. According to some embodiments, the collaboration service may perform disambiguation functions in order to determine which conference meeting is occurring at the current time. In some embodiments, the collaboration service may prompt one of the users within range of the conference room device to select a meeting to start. In some embodiments, the collaboration service may use one or more signals in the calendar information described above to determine which conference meeting to start or to prompt the detected user to start.

According to some embodiments, the collaboration service may determine that there are conflicting entries in one or more calendars. For example, the collaboration service may detect two or more users within range of the conference room device and the scheduling module of the collaboration service may determine that the calendar for one of the detected user two or more entries at the current time. The collaboration service determines if one of the entries is shared by another user within range of the conference room device. If one of the entries is shared by another user, the collaboration service may determine that the shared entry is most likely the meeting that the users intend to attend. The collaboration service may automatically start the meeting associated with the shared entry or prompt one or more of the detected users to start the meeting associated with the shared entry.

In some embodiments, the collaboration service access a list of participants, attendees, or invitees for each of the two or more entries at the current time and determine which entry is for the meeting that the users most likely intend to attend based on the other users detected within range of the conference room device. For example, if User_A has two calendar entries (entry_1 and entry_2) at the current time and the detected users more closely match the participants list for entry_1 than entry_2, the collaboration service may determine that entry_1 is most likely the meeting that the user intends to start. The collaboration service may automatically start the meeting associated with entry_1 or prompt the user to start the meeting associated with entry 1.

In some cases, the collaboration service may determine that the calendar for the conference room device includes two or more entries at the current time. In order to determine which meeting to start, the collaboration service may determine if one of the entries is shared by user that is within range of the conference room device or if the participants list for one of the entries more closely matches the list of users within range of the conference room device.

Various embodiments described herein may include various instances of disambiguation, speech recognition, and text-to-speech that enable a bi-directional interaction and cooperation with a user to initiate a meeting. For example, in one scenario, a user may enter a meeting room that includes a conference room device. The conference room device may detect the user and greet the user. The greeting may be visual (e.g., a video greeting on a screen), textual (a text greeting on the screen or client device), or audible (e.g., a greeting converted from text to speech and played via a speaker on the conference room device). The collaboration service may identify the user, look up a calendar associated with the user, and potentially identify multiple entries for the user at the current time. If multiple entries are found, the conference room device may ask the user "I have found multiple meetings at this time" and list the meetings either textually, audibly (via text-to-speech functionality), or both. The user selects a meeting and the instructions may be converted from speech to text and run through a speech recognition service to determine the user's intent. Once the instructions to start the selected meeting are understood by the collaboration service, the collaboration service may start the selected meeting.

In some embodiments, before a meeting is started, the collaboration service may determine that a user that is detected to be within range of the conference room device is not listed as a participant in the entry for the meeting. Since this may be considered a security issue, the collaboration service may notify the other participants in one or more of the geographic locations about the unlisted user and ask if the participants want to add the unlisted user as a participant to the meeting. Adding the unlisted user as a participant to the meeting may enable the unlisted user to access additional features associated with the conference meeting. For example, an entry for the meeting may be provided to the unlisted user's calendar or the unlisted user may receive any shared documents, presentations, or recordings associated with the meeting.

Figure 6A:
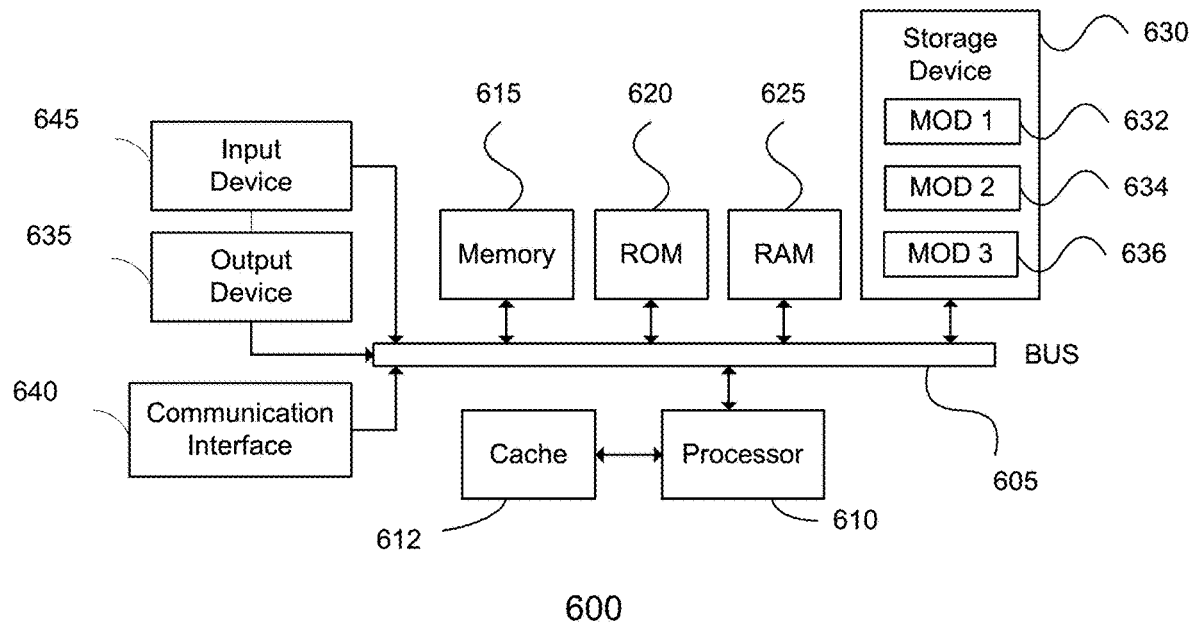
FIGS. 6A and 6B show example possible system embodiments.
Figure 6B:
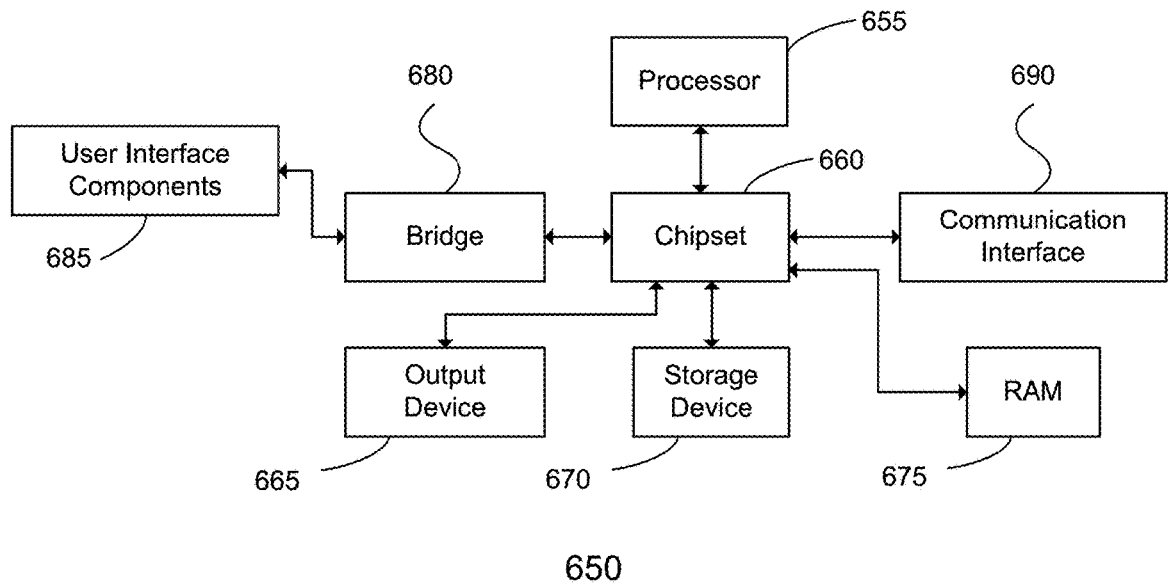

FIG. 6A, and FIG. 6B show example possible system embodiments. The more appropriate embodiment will be apparent to those of ordinary skill in the art when practicing the present technology. Persons of ordinary skill in the art will also readily appreciate that other system embodiments are possible.

FIG. 6A shows a conventional system bus computing system architecture 600 wherein the components of the system are in electrical communication with each other using a bus 605. Example system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output.

There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B shows a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   transmitting an ultrasonic token encoded with a current time and a location of a conference room device, wherein the ultrasonic token is a sound wave;
   receiving from a user device, a response to the ultrasonic token including at least a user identifier;
   in response to receiving the response within a threshold time, determining the conference room device is within range of the user device at the current time;
   accessing a scheduling service to identify a conference meeting associated with the user device that is within the threshold time difference of the current time;

transmitting a request to the user device to prompt the user to start the conference meeting;
receiving a confirmation response from the user; and
starting the conference meeting based on the confirmation response.

2. The computer-implemented method of claim 1, wherein the conference room device is determined to be within range of the user device via an ultrasonic sensor.

3. The computer-implemented method of claim 2, wherein,
the response includes the ultrasonic token.

4. The computer-implemented method of claim 2, wherein the user device is running a collaboration application which is configured to translate the ultrasonic token emitted, and transmit the response from the user device.

5. The computer-implemented method of claim 1, wherein,
the accessing of the scheduling service to identify the conference meeting associated with the user includes locating an entry for the current time in a conference room device calendar associated with the conference room device, and
the user and another user are listed as participants in the conference meeting via the entry.

6. The computer-implemented method of claim 1, wherein,
the accessing of the scheduling service to identify the conference meeting associated with the user includes locating an entry for the current time in a calendar of the user, and
the conference room device is listed in the entry.

7. The computer-implemented method of claim 1, further comprising:
emitting an audible request by the conference room device.

8. The computer-implemented method of claim 1, further comprising:
transmitting an electronic request to a collaboration application on the user device, the electronic request including a request to start the conference meeting.

9. The computer-implemented method of claim 1, further comprising:
transmitting, to a screen input device, instructions to initiate a screen for the conference meeting.

10. The computer-implemented method of claim 1, wherein the conference room device is determined to be within range of the user device via a time-of-flight sensor.

11. The computer-implemented method of claim 1, further comprising:
selecting the conference meeting from among a plurality of conference meetings by identifying a matching entries associated with the conference meeting.

12. The computer-implemented method of claim 1, further comprising:
identifying a second user within range of the conference room device not listed as a participant for the conference meeting; and
notifying the user about the second user.

13. A non-transitory computer readable medium comprising instructions, the instructions, when executed by a computing system, cause the computing system to:
transmit an ultrasonic token encoded with a current time and a location of a conference room device, wherein the ultrasonic token is a sound wave;
receive from a user device, a response to the ultrasonic token including at least a user identifier;
in response to receiving the response within a threshold time, determine the conference room device is within range of the user device at the current time;
access a scheduling service to identify a conference meeting associated with the user device that is within the threshold time difference of the current time;
transmit a request to the user device to prompt the user to start the conference meeting;
receive a confirmation response from the user; and
start the conference meeting based on the confirmation response.

14. The non-transitory computer readable medium of claim 13, wherein the response includes the ultrasonic token.

15. The non-transitory computer readable medium of claim 13, wherein identifying the conference meeting includes locating an entry for the current time in a calendar of the user.

16. A system comprising: a processor; and a non-transitory computer readable medium storing instructions that, when executed by the processor, cause the processor to perform operations comprising:
transmitting an ultrasonic token encoded with a current time and a location of a conference room device, wherein the ultrasonic token is a sound wave;
receiving from a user device, a response to the ultrasonic token including at least a user identifier;
in response to receive the response within a threshold time, determining the conference room device is within range of the user device at the current time;
accessing a scheduling service to identify a conference meeting associated with the user device that is within the threshold time difference of the current time;
transmitting a request to the user device to prompt the user to start the conference meeting;
receiving a confirmation response from the user; and
starting the conference meeting based on the confirmation response.

17. The system of claim 16, wherein the response includes the ultrasonic token.

18. The system of claim 16, wherein the operations include transmitting, to a screen input device, instructions to initiate a screen for the conference meeting.

19. The system of claim 16, wherein the operations include causing an audio interface to communicate with the user.

20. The system of claim 19, wherein the audio interface includes a speaker and a microphone.

\* \* \* \* \*